A. G. THOMSON.
AUTOMOBILE LAMP ATTACHMENT.
APPLICATION FILED DEC. 8, 1908.
1,035,497.
Patented Aug. 13, 1912.
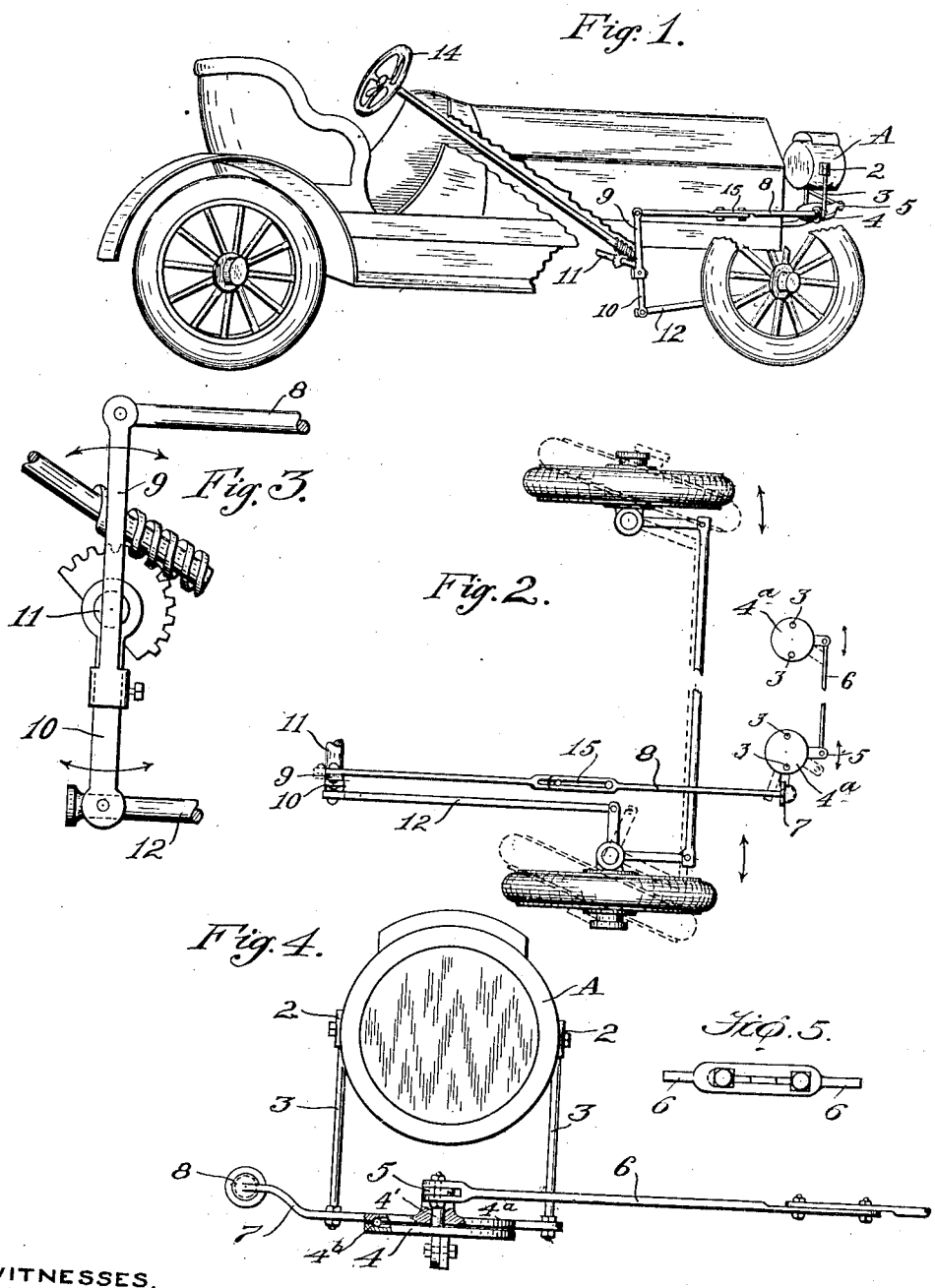
WITNESSES.
INVENTOR
ARTHUR GALE THOMSON
BY
Geo. H. Strong.
HIS ATTORNEY

UNITED STATES PATENT OFFICE.

ARTHUR GALE THOMSON, OF SAN FRANCISCO, CALIFORNIA.

AUTOMOBILE LAMP ATTACHMENT.

1,035,497.          Specification of Letters Patent.      Patented Aug. 13, 1912.

Application filed December 8, 1908. Serial No. 466,447.

*To all whom it may concern:*

Be it known that I, ARTHUR GALE THOMSON, citizen of the United States, residing in the city and county of San Francisco and State of California, have invented new and useful Improvements in Automobile Lamp Attachments, of which the following is a specification.

My invention relates to a connection or attachment for automobile lamps whereby the lamp or lamps will be turned in unison with the front steering wheels so that the rays of the lamp or lamps will be cast along the road in the actual direction of travel.

Automobile lamps are generally mounted rigidly on the machine frame and always cast their rays in a line substantially parallel with the vehicle body. The result is that in traveling over a crooked road, or in turning from side to side in traveling along the road, obstructions and embankments are frequently not seen until it is too late for the driver to correct or check his course and so prevent an accident.

My object is to so mount a lamp that it will turn from side to side synchronously with the movements of the steering wheels, so that a driver can always see exactly what is ahead of him in the immediate direction of travel.

The invention consists of the parts and the construction and combination of parts as hereinafter more fully described and claimed, having reference to the accompanying drawings, in which—

Figure 1 is a portional perspective view of an automobile fitted with the attachment. Fig. 2 is a diagrammatic plan view. Fig. 3 is a detail of the steering gear. Fig. 4 is a front elevation of a lamp. Fig. 5 is a detail in plan showing the extendible connection between the lamps.

In the embodiment of my invention the lamps, which are represented at A, are adapted to be carried on the lamp brackets 2 which are mounted on the posts 3. Each pair of posts 3 is secured to a turn-table plate 4ª, which is adapted to turn about a fixed vertical pivot 4' supported on the base plate 4, which latter is secured in any suitable manner to the body of the machine. Preferably anti-friction balls 4ᵇ are interposed between the turn-table plate 4ª, and the base plate 4. Where two lamps are used on a machine, as is customary, they are connected across, to turn in unison, by the arms 5 on the respective plates 4ª and the adjustable connecting links 6. The turn-table construction here shown and described, and the supporting of a lamp on a turn-table by the standards or posts 3, provide a substantial support for the lamps, such as is essential in an attachment of this character.

Secured to one of the turn-table plates 4ª is a crank arm 7 connected by an adjustable, extendible link 8 to the crank arm 9, which latter is clamped or otherwise detachably secured to the crank 10; the crank 10 being secured to the usual worm shaft 11 operated from the steering wheel, and crank 10 connecting at its lower end with the steering rod 12 which extends to the steering knuckle of the wheel. The cranks 9—10 project in opposite directions, so that as one rocks forward the other rocks back, causing the lamp and wheels to turn always in the same direction. Thus, when the steering wheel 14 is turned so as to throw the crank 10 forward, as in turning the vehicle to the right, the upper opposed arm 9 is thrown backward, pulling the lamp around to the right also, so that its rays will generally extend at all times parallel with the plane of the vehicle wheel.

The connecting rod 8 is preferably made in two sections and slotted and bolted together, as shown at 15, to adapt the device to machines of different types. The connection of the rod 8 with the levers 9 and 7 is preferably of the ball and socket variety, as shown, whereby the lamps are enabled to adjust themselves to the up and down movements of the body with respect to the steering wheels and frame.

Having thus described my invention, what I claim and desire to secure by Letters Patent is—

1. In an automobile, the combination with the body and the front steering wheels thereof, of a lamp, a turn-table plate having a pair of vertical posts between which the lamp is secured, a base plate upon which the turn-table plate is turnable, said base plate being secured to the vehicle, anti-friction rollers interposed between the turn-table plate and the base plate, an arm fixed to the turn-table plate, and connections between the arm and the steering gear for turning the lamp sidewise in unison with the turning of said steering wheels.

2. In an automobile, the combination with the body and the front steering wheels thereof, and steering mechanism for operating the steering wheels, of a pair of lamps, a turn-table plate for each of said lamps, a base plate upon which the turn-table plate is mounted, said base plate being secured to the vehicle, vertical posts on each of the turn-table plates between which the lamps are mounted, extendible connections between the lamps for turning them in unison, said connections permitting the lamps to be adjustable to each other so that they cast their rays more or less nearly parallel, and connections between the lamps and the steering mechanism for turning the lamps in unison with the steering wheels.

3. In an automobile, the combination with the body, steering mechanism, and the steering wheels of the vehicle, of a base plate on the vehicle, a turn-table plate, said base plate having a vertical pivot on which the turn-table plate is mounted, anti-friction rollers between the base plate and turn-table plate, a lamp carried by the turn-table plate, said steering mechanism including a crank member connected with the steering wheels, and connections between the turn-table plate and the crank member of the steering mechanism for turning the lamp sidewise in unison with the steering wheel.

In testimony whereof I have hereunto set my hand in presence of two subscribing witnesses.

ARTHUR GALE THOMSON.

Witnesses:
CHARLES A. PENFIELD,
CHARLES EDELMAN.

Copies of this patent may be obtained for five cents each, by addressing the "Commissioner of Patents, Washington, D. C."